Patented Sept. 1, 1953

2,650,920

UNITED STATES PATENT OFFICE 2,650,920
TRIAZINE VAT DYES
Mario Scalera, Somerville, and Elizabeth M. Hardy, Bound Brook, N. J., assignors to American Cyanamid Company, New York, N. Y., a corporation of Maine No Drawing. Application September 27, 1951, Serial No. 248,657

7 Claims. (Cl. 260—249)

The present invention refers to a new series of orange to red vat dyestuffs of the formula:

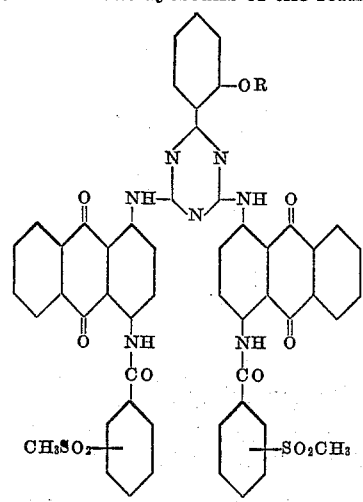

in which R is hydrogen or a lower alkyl radical.

Many triazine vat dyestuffs are known, but in the past, no reds and oranges have been available which combine high strength and color value with a high degree of light fastness. The dyestuffs of the present invention combine, to a high degree, light fastness with high strength and color value. The combination of both these desirable characteristics in the same dyestuff appears to be due entirely to the methylsulfonyl substituents. When they are absent, dyestuffs are produced which are inferior in both color value and in fastness. On the other hand, the position of the methylsulfonyl group in the benzoyl radicals is not critical and dyestuffs combining high color value and great light fastness are obtained with the various isomeric methylsulfonyl-substituted compounds, that is to say, it does not matter whether the methylsulfonyl group is ortho, meta or para to the amido group. It is not known why the methylsulfonyl group in the particular position in the dyestuff is of such critical importance and yet, at the same time, its position on the benzene ring in the two benzoylamido groups is relatively unimportant. No theoretical explanation for these factors is at present known.

It is an advantage of the present invention that the dyestuffs of the new and improved properties may be prepared by simple reactions and require no new or critical techniques. Thus, for example, methylsulfonyl benzoyl halides can be reacted with 1,4-diaminoanthraquinone and the resulting compounds condensed with lower ortho-alkoxyphenyldichlorotriazines. This latter process proceeds in the same manner as has been used to make other triazine dyes and in excellent yield. When it is desired to produce the ortho-hydroxyphenyl compound, that is to say, the dyestuff in which R is hydrogen, this is readily effected by the new process described and claimed in the application of Gadea and Munro, Serial No. 227,942, filed May 23, 1951. This application describes and claims processes for dealkylation of the ortho-alkoxyphenyltriazines by treatment with hydrogen halides.

The dyestuffs of the present invention form vats which are grey to violet-black and from these vats high strength, light fast orange and red dyeings are produced readily.

The present invention will be illustrated in greater detail in the following specific examples, parts being by weight unless otherwise specified. As a number of the intermediates are themselves new chemical compounds, their production is described in separate examples.

Example 1

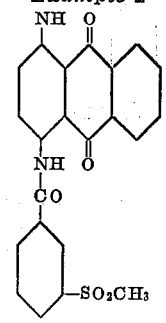

20 parts of m-methylsulfonylbenzoic acid is converted to acid chloride in the ordinary manner by refluxing in 125 parts of thionyl chloride. Excess thionyl chloride is then removed by distillation under reduced pressure, the remaining thick slurry being washed with hexane and dried in vacuo.

A mixture of 15.0 parts of leuco 1,4-diaminoanthraquinone, 11.6 parts of pyridine, and 180 parts of nitrobenzene is stirred and gradually treated with 20.6 parts of the above prepared m-methylsulfonylbenzoyl chloride. The reaction is completed by stirring at 100–110° C., the product then being cooled, filtered, and washed with nitrobenzene followed by alcohol.

Example 2

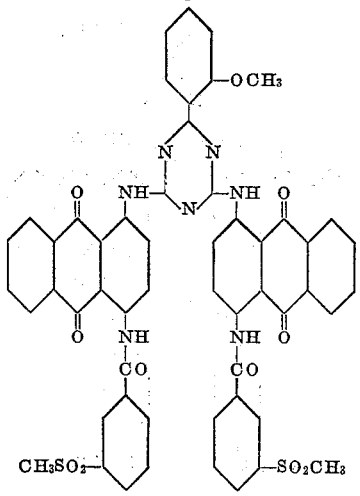

A mixture of 6.3 parts of the product of Example 1 and 1.9 parts of o-methoxy-phenyldichlorotriazine in 60 parts of nitrobenzene is stirred and heated. At approximately 135° C. there occurs a copious evolution of hydrogen chloride, while the mixture thickens and turns red. Stirring and heating are continued, the reaction finally being completed at 150° C. The product is cooled to room temperature, filtered, and washed with nitrobenzene followed by alcohol. The yield is excellent. This product gives red dyeings of good fastness from a greenish gray vat.

*Example 3*

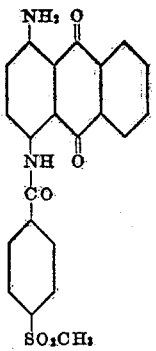

The acid chloride is prepared in the ordinary way from 20 parts of p-methyl-sulfonylbenzoic acid by refluxing in 125 parts of thionyl chloride, the unreacted excess of which is then removed by distillation under reduced pressure. The product is washed with hexane and dried.

A mixture of 15.0 parts of leuco 1,4-diaminoanthraquinone, 11.6 parts of pyridine, and 180 parts of nitrobenzene is stirred thoroughly and gradually treated with 20.4 parts of the above prepared p-methyl-sulfonylbenzoyl chloride. The mixture is heated to 45° C. and the reaction finally completed at 110° C. The product is cooled, filtered, and washed with nitrobenzene followed by alcohol.

*Example 4*

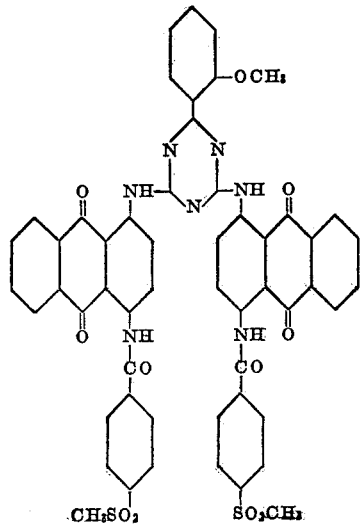

A mixture of 6.3 parts of the product of Example 3 and 1.9 parts of o-methoxy-phenyldichlorotriazine in 60 parts of nitrobenzene is stirred while the temperature is gradually increased to 150° C. When the reaction is complete, the product is cooled, filtered and washed with nitrobenzene followed by alcohol. The resulting red dye can be recrystallized from nitrobenzene. It vats readily to a violet-black vat which dyes cotton red shades of good color value and lightfastness.

*Example 5*

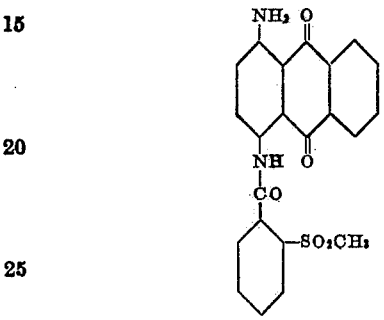

20 parts of o-methylsulfonylbenzoic acid is converted to acid chloride by treatment with 125 parts of thionyl chloride in the ordinary way. The product is washed with hexane and dried in vacuo.

A mixture of 15.0 parts of leuco 1,4-diaminoanthraquinone, 11.6 parts of pyridine, and 180 parts of nitrobenzene is reacted with 20.6 parts of the above o-methylsulfonylbenzoyl chloride as described in the preceding examples. The product is washed with nitrobenzene and alcohol, and dried.

*Example 6*

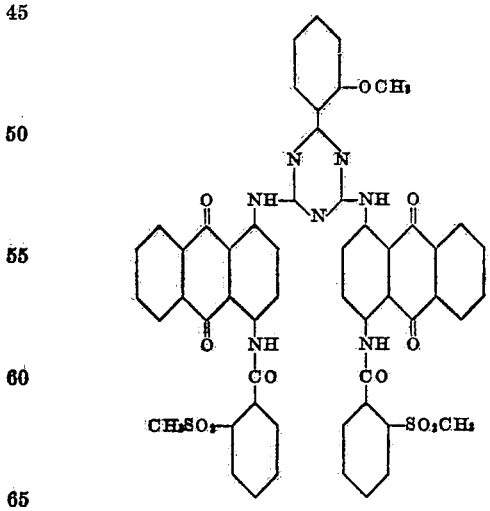

A mixture of 6.3 parts of the product of Example 5 and 1.9 parts of o-methoxyphenyldichlorotriazine in 60 parts of nitrobenzene is reacted as described in the preceding examples. The resulting red slurry is filtered and the product washed with nitrobenzene followed by alcohol. The yield is excellent. It gives very fast orange dyeings from a violet-black vat.

Example 7

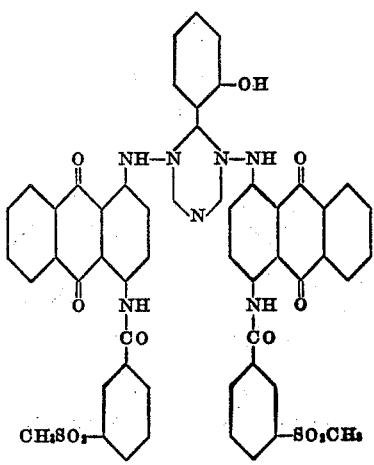

4 parts of the product of Example 2 is dispersed in 80 parts of nitrobenzene, heated to 140° C., and treated at this temperature with a stream of dry hydrogen bromide gas. When the reaction is complete, the slurry is cooled and filtered. The product gives fast red dyeings.

We claim:

1. A dyestuff of the formula:

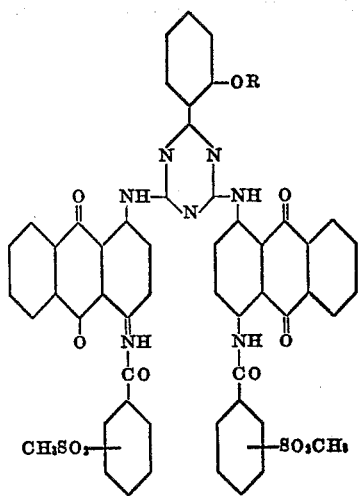

in which R is selected from the group consisting of H and the lower alkyl radicals.

2. A dyestuff of the formula:

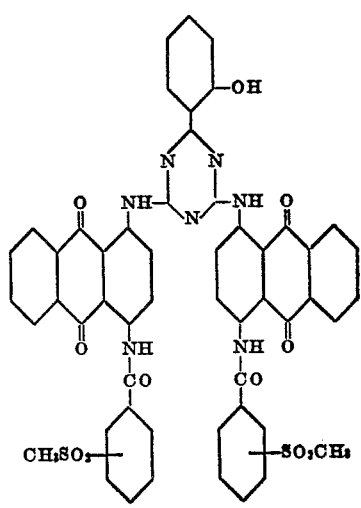

3. A dyestuff of the formula:

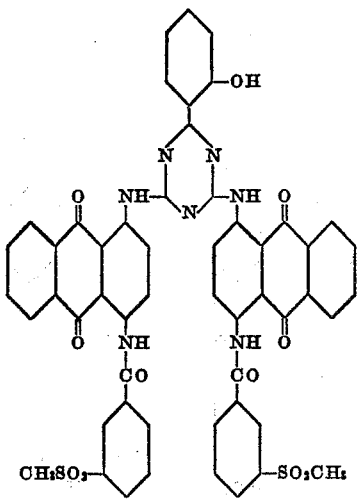

4. A dyestuff of the formula:

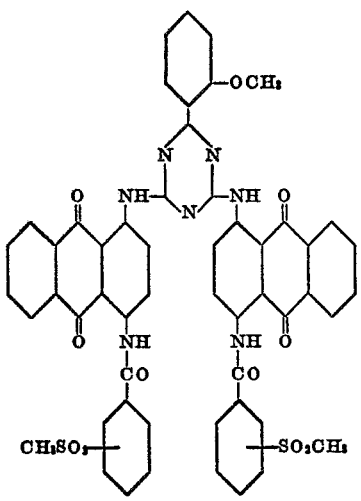

5. A dyestuff of the formula:

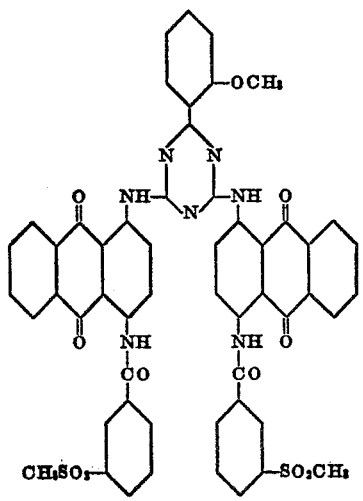

6. A dyestuff of the formula:
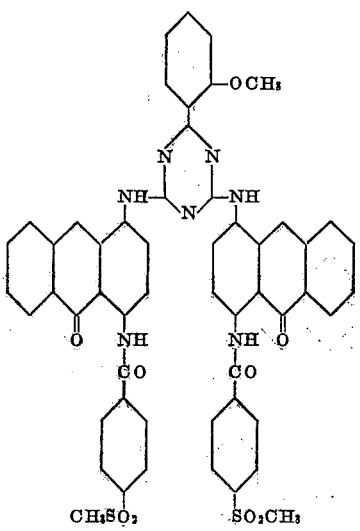
7. A dyestuff of the formula:
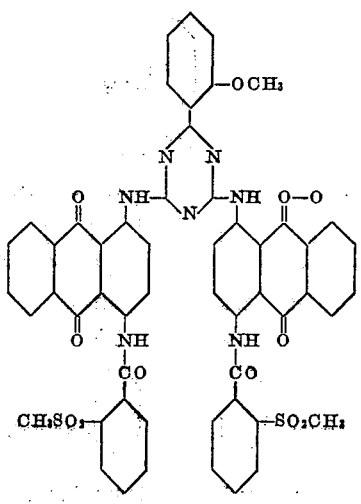
MARIO SCALERA.
ELIZABETH M. HARDY.
References Cited in the file of this patent
FOREIGN PATENTS
| Number | Country | Date |
|---|---|---|
| 796,539 | France | Oct. 21, 1935 |
| 100,398 | Switzerland | July 16, 1923 |